(No Model.)
K. WENDE & M. KUDRASS.
APPARATUS FOR MEASURING QUANTITIES OF GRANULAR MATERIALS.
No. 583,349. Patented May 25, 1897.
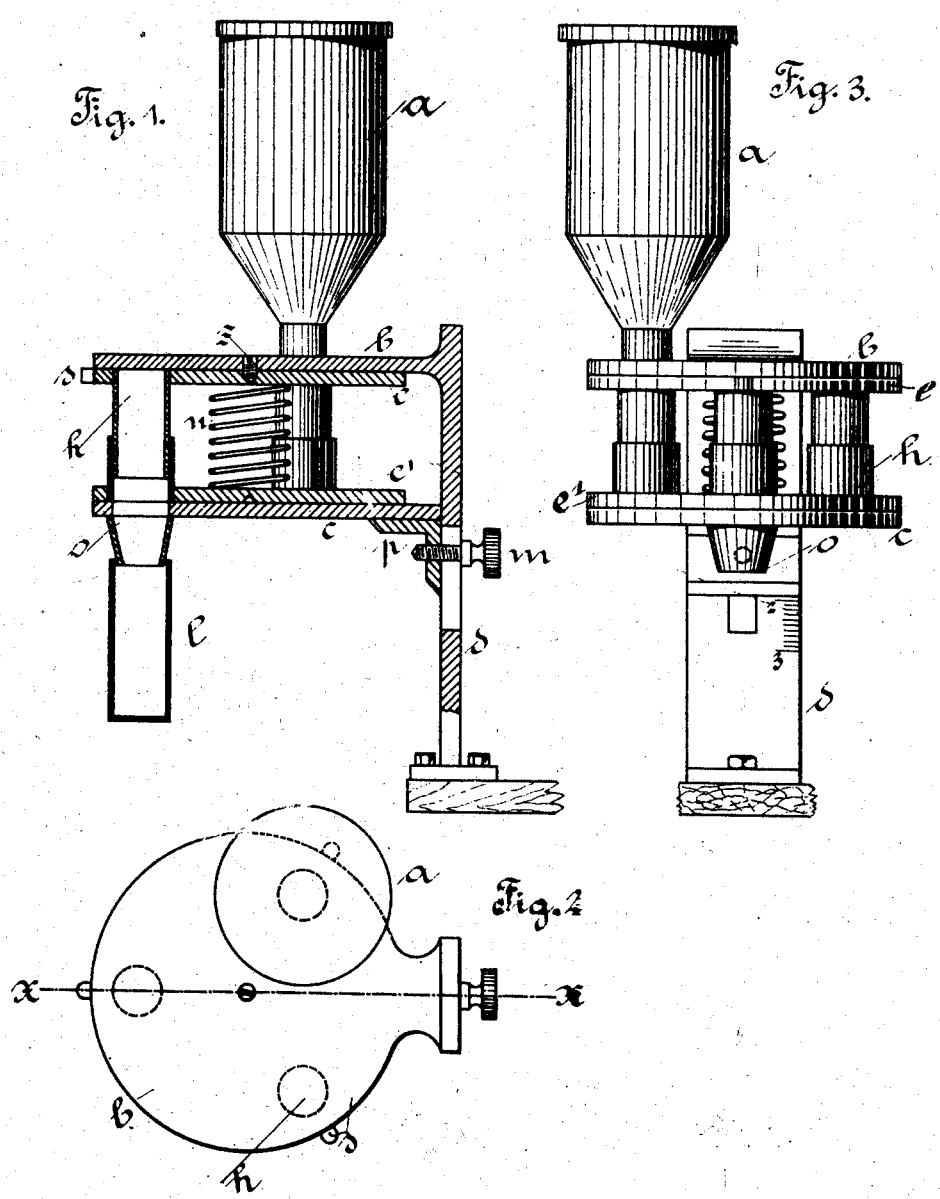
Witnesses
Karl Orms
Richard Xank
Inventors
Karl Wende & Max Kudrass
by Eustace W. Hopkins
Atty.

UNITED STATES PATENT OFFICE.

KARL WENDE, OF NIMPTSCH, AND MAX KUDRASS, OF MÜNSTERBERG, GERMANY.

APPARATUS FOR MEASURING QUANTITIES OF GRANULAR MATERIALS.

SPECIFICATION forming part of Letters Patent No. 583,349, dated May 25, 1897.

Application filed October 17, 1896. Serial No. 609,242. (No model.)

*To all whom it may concern:*

Be it known that we, KARL WENDE, residing at Nimptsch, and MAX KUDRASS, residing at Münsterberg, Prussia, Germany, subjects of the King of Prussia, German Emperor, have invented certain new and useful Improved Apparatus for Measuring Up Predetermined Quantities of Granular or Pulverous Materials, of which the following is a full, clear, and exact description.

The present invention consists of an apparatus for measuring up predetermined and variable quantities of granular or pulverous materials, and comprises the details of construction hereinafter more particularly described, and pointed out in the claim; and in order to render the present specification more easily intelligible reference is had to the accompanying drawings, in which similar letters of reference denote similar parts throughout the several views.

Figure 1 is a vertical section through the apparatus on the line $x\ x$ of Fig. 2; Fig. 2 a plan, and Fig. 3 a front elevation, of the machine.

The apparatus comprises a vertical standard $d$, provided with means at its lower end for clamping it to a table or counter. At its upper part the standard $d$ is provided with two horizontally-projecting plates $b$ and $c$, of which the lower is vertically adjustable with regard to the upper on the said standard by means of a clamping-screw $m$, mounted on a bracket $p$ of the said plate and engaging through a slot of the standard $d$. Between the plates $b$ and $c$ are mounted to rotate on pivot $z$ disks $e$ and $e'$, which are kept in contact with the upper and lower plates by means of a spring $n$. The two disks $e$ and $e'$ are telescopically connected by means of any number of tubes $h$, the lower parts of which are attached to the lower and the upper to the upper plate or disk.

The standard $d$ is provided with a scale, as shown at Fig. 3, on which the bracket $p$ may be adjusted, so that the tubes $h$ may be regulated to receive a certain predeterminable quantity or weight of the granular or pulverous substance to be measured up.

The upper of the two disks $e\ e'$ is provided with projections $s$ on its periphery extending beyond the edge of the upper standard-plate $b$, and thus enabling the two disks with their telescopical tubes to be conveniently turned on their pivot $z$.

The upper plate $b$ is provided with a boring or orifice under which any one of the tubes $h$ may be brought by rotating the disks containing them. Above the boring a hopper $a$ is advantageously arranged. The lower plate $c$ is also provided with an outlet-funnel $o$, said funnel being arranged in the line of rotation of the said tubes $h$, but at a different point of said line as regards the orifice to which the hopper $a$ is attached.

The operation of the device will be obvious from the above description. The material to be measured up is placed in the hopper $a$, the lower outlet of which is closed by the part of the disk $b$ between the tubes $h$. The said tube-disks are now rotated to bring one of the tubes $h$ under the hopper, when it will be filled by the substance falling into it. The disk is now rotated further, so as to bring the full tube over the outlet-funnel $o$, under which the receptacle $l$ is placed, when the quantity of substance measured off by the adjusted tube $h$ will pass into the bag or other receptacle. In the meantime another tube $h$ will have been filled while the first was being emptied, the arrangement of the tubes apart being such as to bring the next tube under the hopper while the first is being emptied.

We claim as our invention—

The combination of a standard $d$ having an upper horizontal stationary plate $b$ and a lower adjustable plate $c$, disks $e\ e'$ mounted between said plates and spring-pressed apart, telescopical tubes $h$ connecting said disks and arranged at equal distances from the center of same, a hopper on the upper plate having outlet through said upper plate, in the line of rotation of the tubes $h$ and an outlet $o$ with conical funnel in the lower plate in the line of rotation of said tubes but not under the hopper, and a clamping-screw in connection with the lower adjustable plate adapted to clamp said plate in position on said standard substantially as described.

In witness whereof we have hereunto set our hands in presence of two witnesses.

KARL WENDE.
MAX KUDRASS.

Witnesses:
OSCAR KRETSCHIMER,
HERRMANN KARTSCH.